Patented Jan. 2, 1934

1,942,386

UNITED STATES PATENT OFFICE 1,942,386

PROCESS FOR PRODUCING DIPHENYL MONO-SULPHONIC ACID

Wesley C. Stoesser, Midland, Mich., and Robert F. Marschner, State College, Pa., assignors to The Dow Chemical Company, Midland, Mich., a corporation of Michigan No Drawing. Application June 2, 1932
Serial No. 615,030

6 Claims. (Cl. 260—159)

The present invention relates to improvements in processes for sulphonating diphenyl; and more particularly regards a process whereby diphenyl may be sulphonated so as to form substantially the mono-sulphonic acid thereof.

The sulphonation of diphenyl by heating a mixture of diphenyl and sulphuric acid at moderate temperatures, e. g. about 70° C., and atmospheric pressure, with or without the use of a solvent, is known, but certain disadvantages inure to such mode of procedure. For instance, if the sulphonation of the diphenyl is carried substantially to completion, the following disadvantages will attach to the procedure:—(1) It is necessary to use a large excess of sulphuric acid, i. e. about 4 mols of $H_2SO_4$ per mol of diphenyl; (2) a relatively large percentage of the undersirable di-sulphonic acid compound is formed; and (3) the reaction product is a mixture of mono- and di-sulphonic acids and excess sulphuric acid which are very difficult to seperate so as to obtain a relatively pure mono- acid. On the other hand, if the sulphonation of the diphenyl is not carried to completion, it is possible to form the mono-sulphonic acid substantially free from the di-sulphonic acid, but such procedure is disadvantageous because of (1) the low percentage conversion of diphenyl to the mono-sulphonic acid compound, e. g. about 40 per cent; and (2) the difficulty of separating the reaction product consisting of mono-acid, excess sulphuric acid and unreacted diphenyl.

It is, accordingly, among the objects of the invention to provide a process whereby diphenyl mono-sulphonic acid may be produced in high yield and largely free from the di-sulphonic acid. To this end we have found that the difficulties inherent in prior processes for the production of diphenyl mono-sulphonic acid can be substantially eliminated by reacting diphenyl with sulphuric acid at a pressure below atmospheric and at a temperature materially above that previously used.

To the accomplishment of the foregoing and related ends, the invention, then, consists of the process hereinafter fully described and particularly pointed out in the claims, the following description setting forth in detail one mode of carrying out the invention, such disclosed mode illustrating, however, but one of various ways in which the principle of the invention may be used.

Our process comprises heating a mixture of diphenyl and concentrated or fuming sulphuric acid at a temperature between about 100° and about 175° C., preferably between about 130° and 150° C., and under an absolute pressure materially below atmospheric pressure, preferably between about 50 and about 150 millimeters of mercury, absolute.

The concentration of the sulphuric acid which we employ in carrying out our process may be varied over the range between 90 and 100 per cent by weight of $H_2SO_4$, or may be fuming acid, but we have found it more advantageous to use an aqueous acid containing about 95 to 98 per cent by weight of $H_2SO_4$. The use in the process of acid less concentrated than 95 per cent does not decrease the purity of the product, but does considerably increase the time required to sulphonate a given amount of diphenyl over that required when a more concentrated acid is employed. We have determined that the ratio of sulphuric acid to diphenyl should be between about 1.0 and 1.6 mols of acid, calculated as anhydrous, preferably between about 1.1 and 1.4 mols thereof, to 1.0 mol of diphenyl. We find that, if a ratio of substantially less than 1.1 mols of acid to 1.0 mol of diphenyl is used, a portion of the diphenyl will be unreacted; and, that if more than about 1.4 mols of acid per mol of diphenyl is used, there is a tendency towards the production of the undesirable disulphonic acid.

The use in the process of sub-atmospheric pressure, preferably between about 50 and 150 millimeters of mercury absolute, is distinctly advantageous in that it permits the process to be carried out with a smaller excess of sulphuric acid than could otherwise be used. If temperatures in the range between 100° and 175° C. are used in the sulphonation of diphenyl with a ratio of sulphuric acid to diphenyl in the range between 1.1 and 1.4 mols of $H_2SO_4$ per mol of diphenyl, without the use of sub-atmospheric pressures, a large proportion of the diphenyl will be unreacted and a low conversion to the mono-sulphonic acid is obtained. Such last mentioned procedure necessitates the difficult process of separating the mono-acid and unreacted diphenyl before the mono-acid can be utilized. However, by effecting the reaction at a temperature in the range between about 100° and 175° C., preferably between about 130° and 150° C., under sub-atmospheric pressure, a very complete conversion of diphenyl to the mono-sulphonic acid is obtained. The continuous evaporation of the water formed during the reaction between the sulphuric acid and diphenyl is also effected under the foregoing conditions of temperature and pressure. By thus continuously evaporating the water of reaction, dilution of the sulphuric acid thereby is avoided and the sulphonation proceeds much more rapidly to completion than when the water is not removed.

The following example is illustrative of the result which may be obtained by carrying out our improved process for producing diphenyl monosulphonic acid:—

An iron reactor, equipped with a mechanical agitator and connected to a vacuum pump, was charged with 102.7 pounds (0.67 mol) of diphenyl. The diphenyl was heated to about 145° C., meanwhile being stirred constantly, and the pressure in the reactor was reduced from atmospheric to about 125 millimeters of mercury absolute. During the next 90 minutes, a total of 81.7 pounds of 96 per cent sulphuric acid, or 78.4 pounds (0.8 mol) of anhydrous $H_2SO_4$, was added to the diphenyl in the reactor at the rate of about 0.74 pounds per minute. The amount of sulphuric acid added was, therefore, in the ratio of 1.2 mols of $H_2SO_4$ per mol of diphenyl. The reaction mixture was maintained at a temperature of about 145° C. and the pressure was held at about 125 millimeters of mercury absolute during the addition of the acid, and then for 90 minutes after all the acid had been added. At the end of this period the heat was shut off from the reactor and the pressure therein brought back to atmospheric. Approximately 2.5 pounds of unreacted diphenyl was recovered from the vacuum line. The yield of diphenyl mono-sulphonic acid was 146.5 pounds, or about 94 per cent of theoretical based on diphenyl reacted.

In commercial practice, using large quantities of materials, it has been found desirable, due to the heat of reaction developed, to begin the addition of sulphuric acid when the diphenyl attains a temperature between about 80° and 100° C. The heat developed by the sulphonation reaction is sufficient to cause a rise of several degrees in temperature of the reaction mixture, and it was found that unless the addition of the acid was begun at temperatures lower than that finally attained an undesirable amount of unreacted diphenyl would distill out from the reactor along with the water of reaction. By starting the addition of the acid at temperatures within the range specified this difficulty is avoided.

Among the advantages enjoyed by our improved process for producing diphenyl mono-sulphonic acid are:—(1) The time required to complete the sulphonation is materially reduced as against the time required in prior processes; (2) a high yield of mono-sulphonic acid based on the diphenyl reacted is obtained; (3) only a slight excess of sulphuric acid is required; and (4) the reaction product is technically pure and suitable for use without necessity for further purification.

Other modes of applying the principle of our invention may be employed instead of the one explained, change being made as regards the process herein disclosed, provided the step or steps stated by any of the following claims or the equivalent of such stated step or steps be employed.

We therefore particularly point out and distinctly claim as our invention:—

1. In a process for sulphonating diphenyl, the step which consists in reacting diphenyl with sulphuric acid at a temperature between about 100° and about 175° C. under sub-atmospheric pressure.

2. The process for the production of diphenyl mono-sulphonic acid which comprises reacting diphenyl with concentrated sulphuric acid in the ratio of between about 1.0 and 1.6 mols of $H_2SO_4$ per mol of diphenyl at a temperature between about 100° and about 175° C. under a pressure materially below atmospheric.

3. The process for the production of diphenyl mono-sulphonic acid which comprises reacting diphenyl with concentrated sulphuric acid in the ratio of between about 1.1 and 1.4 mols of $H_2SO_4$ per mol of diphenyl at a temperature between about 100° and about 175° C. under an absolute pressure below about 150 millimeters of mercury.

4. The process for the production of diphenyl mono-sulphonic acid which comprises reacting diphenyl and concentrated sulphuric acid at a temperature between about 130° and 150° C. under an absolute pressure between about 50 and 150 millimeters of mercury.

5. The process for the production of diphenyl mono-sulphonic acid which comprises reacting diphenyl and sulphuric acid containing between about 95 and 98 per cent by weight of $H_2SO_4$ at a temperature between about 130° and 150° C. under an absolute pressure between about 50 and 150 millimeters of mercury.

6. In a process for sulphonating diphenyl, the steps which consist in reacting diphenyl with sulphuric acid at a temperature between about 100° and about 175° C. under a pressure materially below atmospheric, and recovering the unreacted diphenyl distilled from the reaction mixture.

WESLEY C. STOESSER.
ROBERT F. MARSCHNER.